United States Patent
Du et al.

(10) Patent No.: US 11,271,423 B2
(45) Date of Patent: *Mar. 8, 2022

(54) CIRCUIT AND METHOD FOR CONTROLLING CHARGING OF EMERGENCY LIGHTING LUMINAIRES BY A SWITCH

(71) Applicant: Shanghai Sinceretek Microelectronics Technology Co., Ltd., Shanghai (CN)

(72) Inventors: Hongyue Du, Shanghai (CN); Siyuan Xu, Shanghai (CN)

(73) Assignee: SHANGHAI SINCERETEK MICROELECTRONICS TECHNOLOGY CO., LTD., Shanghai (CN)

( * ) Notice: Subject to any disclaimer, the term of this patent is extended or adjusted under 35 U.S.C. 154(b) by 37 days.

This patent is subject to a terminal disclaimer.

(21) Appl. No.: 17/037,695

(22) Filed: Sep. 30, 2020

(65) Prior Publication Data

US 2021/0119479 A1 Apr. 22, 2021

(30) Foreign Application Priority Data

Oct. 17, 2019 (CN) .......................... 201910988690.9

(51) Int. Cl.
| | |
|---|---|
| *H05B 47/105* | (2020.01) |
| *H02J 9/06* | (2006.01) |
| *F21S 9/02* | (2006.01) |
| *F21V 23/04* | (2006.01) |
| *F21Y 115/10* | (2016.01) |

(52) U.S. Cl.
CPC ............... *H02J 9/068* (2020.01); *F21S 9/024* (2013.01); *F21V 23/0442* (2013.01); *H02J 9/063* (2020.01); *H02J 9/065* (2013.01); *F21Y 2115/10* (2016.08)

(58) Field of Classification Search
CPC .. H02J 9/068; H02J 9/063; H02J 9/065; F21S 9/024; F21V 23/0442; F21Y 2115/10; H05B 47/105
See application file for complete search history.

(56) References Cited

U.S. PATENT DOCUMENTS

2018/0058677 A1* 3/2018 Wu ....................... H05B 45/375

* cited by examiner

*Primary Examiner* — Henry Luong
(74) *Attorney, Agent, or Firm* — Bayramoglu Law Offices LLC

(57) ABSTRACT

A circuit includes an emergency lighting system and an AC/DC converter. An output terminal of the emergency lighting system is electrically connected to a LED load, and the other output terminal LED_ON of the emergency lighting system is electrically connected to a switch S2. The switch S2 is controlled by the emergency lighting system. The emergency lighting system includes an AC input detection module, a switching time detection module and a lithium battery. The AC input detection module is electrically connected to a neutral wire VN and a live wire VL. The switching time detection module is electrically connected between an output terminal of the AC input detection module and the LED_ON terminal. An output terminal of the AC/DC converter is electrically connected to a positive electrode of the lithium battery, and the other output terminal of the AC/DC converter is electrically connected to the LED load.

14 Claims, 2 Drawing Sheets

CIRCUIT AND METHOD FOR CONTROLLING CHARGING OF EMERGENCY LIGHTING LUMINAIRES BY A SWITCH

CROSS REFERENCE TO THE RELATED APPLICATIONS

This application is based upon and claims priority to Chinese Patent Application No. 201910988690.9, filed on Oct. 17, 2019, the entire contents of which are incorporated herein by reference.

TECHNICAL FIELD

The present invention relates to the technical field of circuit, in particular to a circuit for controlling charging of an emergency lighting luminaire by a switch, and the method thereof.

BACKGROUND

For convenience of simple controlling of an emergency lighting system, a switch for controlling the ON/OFF state of luminaires is typically provided in the emergency lighting system. For example, in the emergency lighting system shown in FIG. 1, when the switch is closed, if the alternating current (AC) network power supply is normal, then the system is supplied by the AC network, and the emergency lighting control chip detects the AC network voltage and turns off the emergency lighting. When an AC/DC converter supplies power to the output LED, it also charges the battery. If the AC network stops supplying the power to the system, there is a low resistance state between the neutral wire VN and the live wire VL, and there is no AC high-voltage signal. When the emergency lighting control chip detects this state, it will turn on the emergency lighting luminaire.

When the switch is open, no matter whether the AC power supply is normal or not, the emergency lighting control chip cannot detect the AC network voltage, and can detect a high resistance between VN and VL. In this case, the emergency lighting control chip turns off the emergency lighting luminaire.

As can be seen from the circuit in FIG. 1, in the above simply controlled emergency lighting control system, the output of the AC/DC converter has two output terminals, wherein the output terminal V1 is used to light up the LED load, and the output terminal V2 is used to charge the battery. Therefore, when the battery of emergency lighting system needs to be charged, the output of the AC/DC converter must be established, that is, when charging the battery, the LED load must be lit. This system has two disadvantages as follows: (1) the AC/DC converter controls the total output power of the AC/DC converter, but cannot allocate the two output powers, which causes the battery charging current to change with the battery voltage during the charging process. Also, the battery charging current changes with the LED load, thus leading to uncontrollable battery charging time; (2) since the output voltages V1 and V2 must be established at the same time, when charging the battery, most of output energy of the AC/DC converter is used to supply the LED load, resulting in power loss and waste.

SUMMARY

In order to solve the above technical problem, the present invention provides a circuit for controlling charging of an emergency lighting luminaire by a switch, and the method thereof. In the simple emergency lighting system only controlled by switch, when the battery of emergency lighting system needs to be charged, all the output energy of the AC/DC converter is used to charge the battery, instead of lighting the load led. In this way, the battery charging current will be greatly improved, and the charging current is the total output energy of the AC/DC converter. According to the needs of luminaire users, the system can use the output of the AC/DC converter to light up the LED and supply power to the battery, or turn off the LED load to supply power to the battery separately.

To achieve the above purpose, the present invention is achieved by the following technical solution:

A circuit for controlling charging of an emergency lighting luminaire by a switch includes an emergency lighting system and an AC/DC converter. An output terminal of the emergency lighting system is electrically connected to a LED load, and the other output terminal LED_ON of the emergency lighting system is electrically connected to a switch S2. The switch S2 is controlled by the emergency lighting system. The emergency lighting system includes an AC input detection module, a switching time detection module and a lithium battery. The AC input detection module is electrically connected to a neutral wire VN and a live wire VL for detecting AC network voltage and the state of a power network switch S1. The switching time detection module is electrically connected between an output terminal of the AC input detection module and the output terminal LED_ON. An output terminal of the AC/DC converter is electrically connected to a positive electrode of the lithium battery, and the other output terminal is electrically connected to the LED load. The LED load is connected to ground after connecting the switch S2 in series.

Preferably, the emergency lighting system further includes a battery protection management module. The battery protection management module is electrically connected to a positive end and a negative end of the lithium battery, and the battery protection management module includes a battery overcharge protection module, an over-current and output short circuit protection module and a battery over-discharge protection module. The improvement of the optimization solution is that the battery protection management module can control the charging, discharging and protection state of the battery by detecting the battery voltage.

Preferably, the circuit for controlling charging of the emergency lighting luminaire by the switch further includes a rectifier bridge BR. Two AC input terminals of the rectifier bridge BR are connected to the live wire VL and the neutral wire VN, respectively. The live wire VL is connected to the AC input terminals of the rectifier bridge BR through the switch S1. An output positive terminal of the rectifier bridge BR is connected to a voltage bus (VBUS) interface. An output negative terminal is connected to ground. The VBUS interface is connected to a capacitor C1, and the VBUS interface is connected to an input terminal of the AC/DC converter.

Preferably, when the switch S1 is closed, the AC input detection module detects that an impedance between the live wire VL and the neutral wire VN is in a low resistance state; when the switch S1 is open, the AC input detection module detects that the impedance between the live wire VL and the neutral wire VN is in a high resistance state.

More preferably, the switching time detection module is configured to predetermine a time Toff. When the switching time detection module detects that a time period T for maintaining the impedance between the live wire VL and the neutral wire VN in the high resistance state by a "low resistance to high resistance to low resistance" state switching mode is less than the time Toff, the LED_ON outputs a low level, and when the time period T is greater than or equal to the time Toff, the LED_ON outputs a high level.

More preferably, the LED_ON outputs a low level, the emergency lighting system controls the switch S2 to be open; the LED_ON outputs a high level, the emergency lighting system controls the switch S2 to be closed.

A method for controlling charging of an emergency lighting luminaire by a switch includes: using the above-mentioned circuit for controlling charging of the emergency lighting luminaire by the switch, wherein the emergency lighting system changes the on-off of the LED load by controlling the state of the switch S2, thereby and partial or overall output energy of the AC/DC converter is used to charge the lithium battery. Preferably, when the switch S2 is open, the LED load is disconnected from the output of the AC/DC converter, and the overall output energy of the AC/DC converter is used to charge the lithium battery; when the switch S2 is closed, the LED load is connected to an output terminal V1 of the AC/DC converter, and the partial output energy of the AC/DC converter is used to charge the lithium battery.

Compared with the prior art, the present invention has the following beneficial effects:

The circuit and method for controlling charging of an emergency lighting luminaire by a switch of the present invention can use the original control switch to separately charge the battery of the emergency lighting luminaires without lighting the LED load of the emergency lighting system, nor increasing the control complexity of the existing emergency lighting luminaire system.

DETAILED DESCRIPTION OF THE EMBODIMENTS

Figure 1:
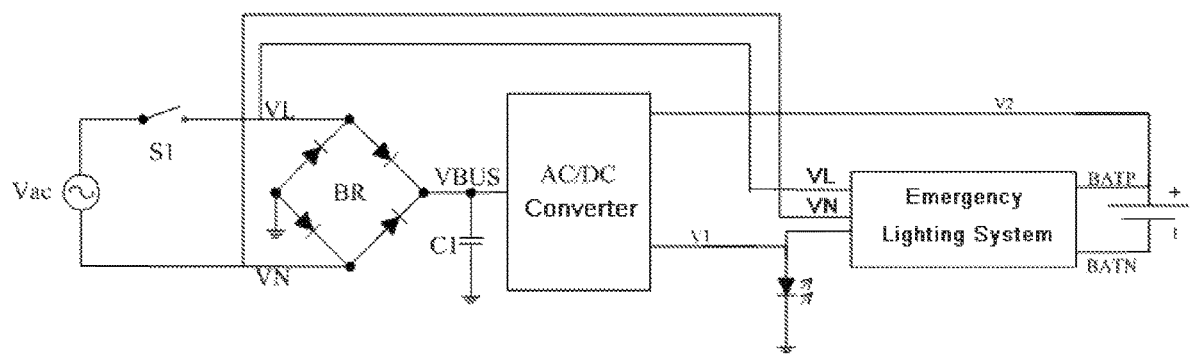
FIG. 1 is a circuit diagram of an emergency lighting system in the prior art.
Figure 2:
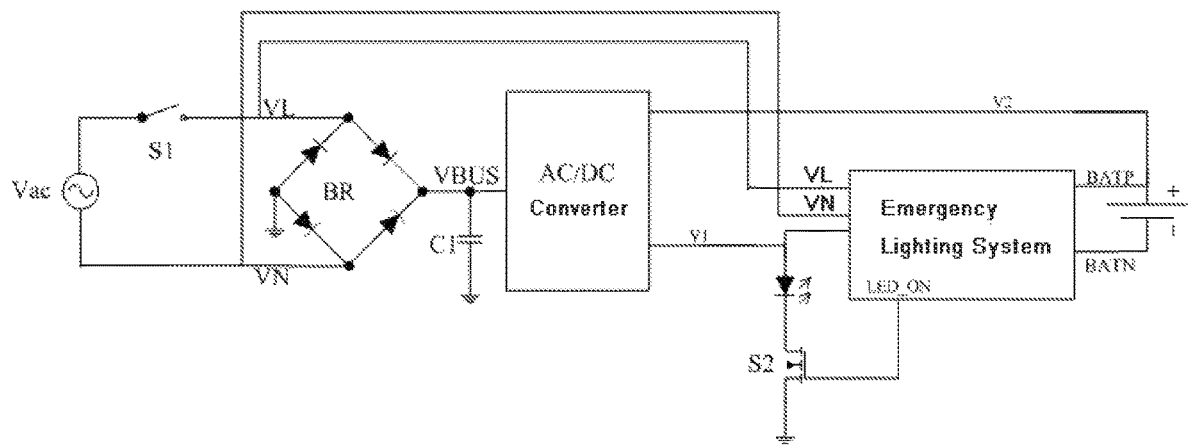
FIG. 2 is a schematic diagram of a circuit for controlling charging of an emergency lighting luminaire by a switch according to the present invention.
Figure 3:
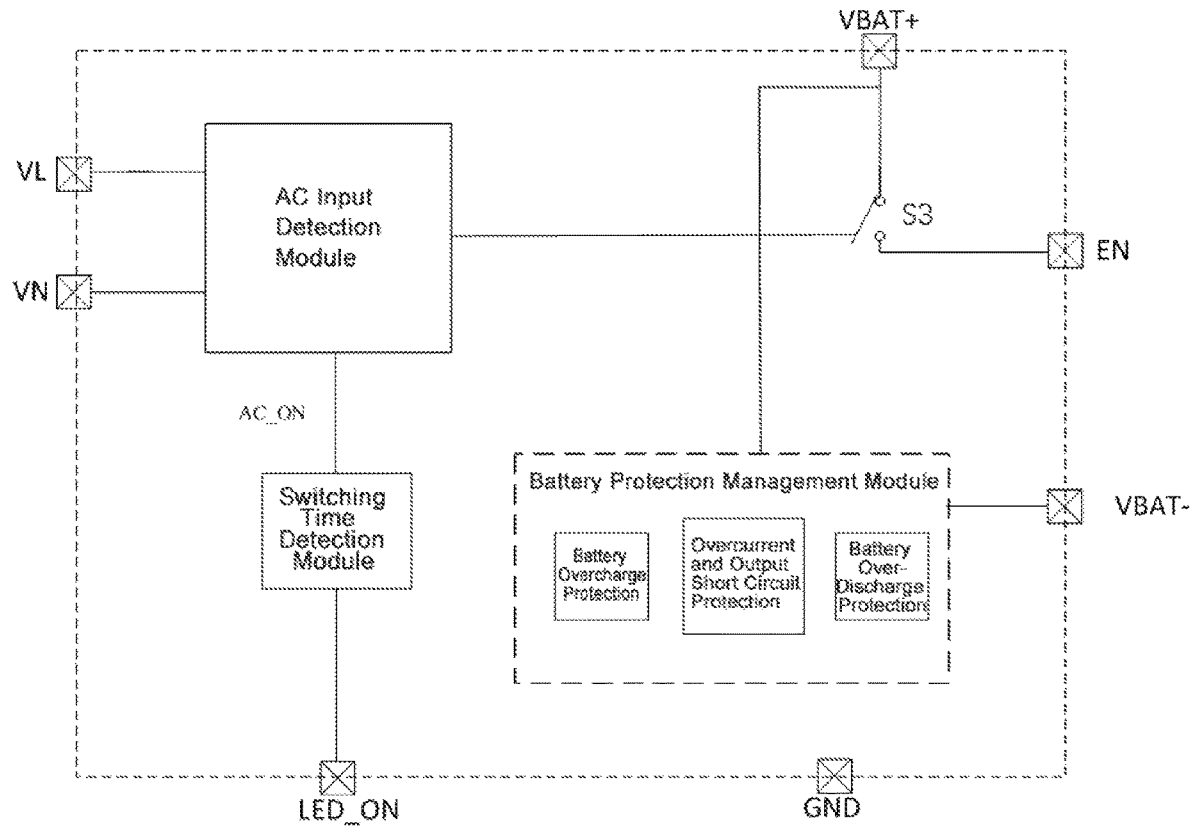
FIG. 3 is an internal schematic diagram pf an emergency lighting system of the present invention.

In order to clearly illustrate the present invention, the content of the present invention will be further described below in conjunction with the drawings and embodiments, but the present invention is not limited to the following embodiments.

Embodiment

A circuit for controlling charging of an emergency lighting luminaire by a switch, includes an emergency lighting system and an AC/DC converter. An output terminal of the emergency lighting system is electrically connected to a LED load, and the other output terminal LED_ON of the emergency lighting system is electrically connected to a switch S2. The switch S2 is controlled by the emergency lighting system. The emergency lighting system includes an AC input detection module, a switching time detection module and a lithium battery. The AC input detection module is electrically connected to a neutral wire VN and a live wire VL for detecting AC network voltage and the state of a power network switch S1. The switching time detection module is electrically connected between an output terminal of the AC input detection module and the output terminal LED_ON. An output terminal of the AC/DC converter is electrically connected to a positive electrode of the lithium battery, and the other output terminal of the AC/DC converter is electrically connected to the LED load. The LED load is connected to the switch S2 in series and then is connected to ground.

The AC/DC converter converts AC voltage/current to direct current (DC) voltage/current. When the AC network normally supplies power, the output terminal V1 of the AC/DC converter supplies power to the LED load, and the output terminal V1 of the AC/DC converter also charges the lithium battery of the emergency lighting system.

The emergency lighting system further includes a battery protection management module, the battery protection management module is electrically connected to a positive end and a negative end of the lithium battery, and the battery protection management module includes a battery overcharge protection module, an overcurrent and output short circuit protection module and a battery over-discharge protection module. The battery protection management module can control the voltage of the battery so as to control charging, discharging and protection state of the battery.

Among them, the lithium battery is connected to the switch S3. When the switch S3 is closed, the output terminal EN of the emergency lighting system is short circuited with VBAT+, and the voltage of the output terminal EN of the emergency lighting system is equal to the voltage of the lithium battery; when the switch S3 is open, the output state of the output terminal EN of the emergency lighting system is the high resistance state.

The circuit further includes a rectifier bridge BR. Two AC input terminals of the rectifier bridge BR are respectively connected to the live wire VL and the neutral wire VN. The live wire VL is connected to the AC input terminal of the rectifier bridge BR through the switch S1. An output positive terminal of the rectifier bridge BR is connected to the voltage bus (VBUS) interface, and an output negative terminal of the rectifier bridge BR is connected to ground. The VBUS interface is connected to a capacitor C1, and the VBUS interface is connected to an input terminal of the AC/DC converter.

When the switch S1 is closed, the AC input detection module detects that an impedance between the live wire VL and the neutral wire VN is in a low resistance state; when the switch S1 is open, the AC input detection module detects that the impedance between the live wire VL and the neutral wire VN is in a high resistance state. The switching time detection module detects a time period T for maintaining the impedance between the live wire VL and the neutral wire VN in the high resistance state by a "low resistance to high resistance to low resistance" state switching mode so as to output the voltage of the LED_ON terminal.

The switching time detection module is configured to predetermine a time Toff. When the time period T is less than the time Toff, the LED_ON outputs a low level, and when the time period T is greater than or equal to the time Toff, the LED_ON outputs a high level.

If the LED_ON outputs the low level, the emergency lighting system controls the switch S2 to be open; if the LED_ON outputs the high level, the emergency lighting system controls the switch S2 to be closed.

Figure 4:
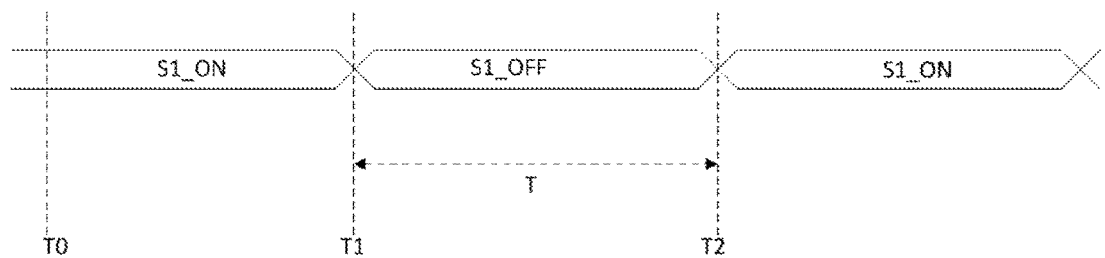
FIG. 4 is a schematic diagram of the time period T described in an embodiment.

As shown in FIG. 4, the control process is described in detail as follows.

When the initial state of the switch S1 is closed, and the supply of the AC network is interrupted, the AC input detection module detects that there is no AC high-voltage signal on the live wire VL or the neutral wire VN. Moreover, since the switch S1 is closed, the impedance between the live wire VL and the neutral wire VN is low, and at this time, the AC input detection module defines the state of the system as the emergency lighting state.

At the T1 moment, the state of the switch S1 changes to OFF. At this time, the AC input detection module cannot detect the AC high voltage signal of the live wire VL or the neutral wire VN because S1 is open, and the resistance between the live wire VL and the neutral wire VN is in the high resistance state due to the cut-off of S1. The AC input detection module defines the state of the system as the open state of the switch S1.

At the T2 moment, the state of the switch S1 is closed, and the supply of the AC network is interrupted, then the system re-enters the emergency lighting state according to the previous definition.

Further, the AC input detection module is used to detect the AC input state and the state of the switch S1. According to the input state of the AC and the state of the switch S1, the closed/open state of the switch S3 is controlled. At the same time, the AC_ON signal is output according to the AC input state. When the AC input voltage is detected, AC_ON=1; and when the AC input voltage is not detected, AC_ON=0.

The switching time detection module is used to detect the delay between the two AC_ON=1. When the delay between the two AC_ON=1 is less than the internal Toff time, outputs signal LED_ON=0; when the delay between the two AC_ON=1 is greater than or equal to the Toff time, outputs signal LED_ON=1.

The LED_ON is used to control the state of the switch S2, when LED_ON=0, the emergency lighting system controls the switch S2 to be open; when LED_ON=1, the emergency lighting system controls the switch S2 to be closed.

A method for controlling charging of an emergency lighting luminaire by a switch, using the above circuit, in which the emergency lighting system changes the on-off of the LED load by controlling the state of the switch S2, and partial or overall output energy of the AC/DC converter is used to charge the lithium battery.

The switch S2 is used to control the state of the LED load. When the switch S2 is closed, the LED load is connected to the output terminal V1 of the AC/DC converter. Thus, the output of the AC/DC converter can be used to light up the LED emergency lighting luminaire. When the switch S2 is open, the LED load is disconnected from the output terminal of the AC/DC converter. Thus, even the output voltage of the AC/DC converter is normal, the LED luminaire will not be lit up. Therefore, the overall output energy of the AC/DC converter is used to charge the battery.

Although the embodiments of the present invention have been shown and described, it should be understood to those of ordinary skill in the art that a variety of changes, modifications, substitutions and modifications can be made to these embodiments without departing from the principle and spirit of the present invention, and the scope of the present invention is limited by the appended claims and the equivalents thereof.

What is claimed is:

1. A circuit for controlling charging of an emergency lighting luminaire by a switch, comprising an emergency lighting system and an AC/DC converter, wherein:
    a first output terminal of the emergency lighting system is electrically connected to a LED, a second output terminal of the emergency lighting system is electrically connected to a switch, and the switch is controlled by the emergency lighting system;
    the emergency lighting system comprises an AC input detection module, a switching time detection module and a lithium battery, wherein
        the AC input detection module is electrically connected to a neutral wire and a live wire for detecting AC network voltage and a state of a power network switch;
        the switching time detection module is electrically connected between an output terminal of the AC input detection module and the second output terminal of the emergency lighting system;
        a first output terminal of the AC/DC converter is electrically connected to a positive electrode of the lithium battery, and a second output terminal of the AC/DC converter is electrically connected to the LED; and
        the LED is connected to the switch in series and then connected to ground.

2. The circuit according to claim 1, wherein the emergency lighting system further comprises a battery protection management module, the battery protection management module is electrically connected to a positive end and a negative end of the lithium battery, and the battery protection management module comprises a battery overcharge protection module, an overcurrent and output short circuit protection module and a battery over-discharge protection module.

3. The circuit according to claim 1, further comprising a rectifier bridge, wherein
    a first AC input terminal of the rectifier bridge is connected to the neutral wire, the live wire is connected to a second AC input terminal of the rectifier bridge through the power network switch, an output positive terminal of the rectifier bridge is connected to a voltage bus (VBUS) interface, an output negative terminal of the rectifier bridge is connected to ground, the VBUS interface is connected to a capacitor, and the VBUS interface is connected to an input terminal of the AC/DC converter.

4. The circuit according to claim 1, wherein when the power network switch is closed, the AC input detection module detects that an impedance between the live wire and the neutral wire is in a low resistance state; when the power network switch is open, the AC input detection module detects that the impedance between the live wire and the neutral wire is in a high resistance state.

5. The circuit according to claim 4, wherein the switching time detection module is configured to predetermine a time, when the switching time detection module detects that a time period for maintaining the impedance between the live wire and the neutral wire in the high resistance state by a "low resistance to high resistance to low resistance" state switching mode is less than the time, the second output terminal of the emergency lighting system outputs a low level, and when the time period is greater than or equal to the time, the second output terminal of the emergency lighting system outputs a high level.

6. The circuit according to claim 5, wherein when the second output terminal of the emergency lighting system outputs the low level, the emergency lighting system controls the switch to be open; when the second output terminal of the emergency lighting system outputs the high level, the emergency lighting system controls the switch to be closed.

7. The circuit according to claim 1, wherein the emergency lighting system controls the LED to be turned on or turned off by controlling a state of the switch, and partial or overall output energy of the AC/DC converter is controlled to charge the lithium battery.

8. The circuit according to claim 7, wherein when the switch is open, the LED is disconnected from an output terminal of the AC/DC converter, and the overall output energy of the AC/DC converter is used to charge the lithium battery; when the switch is closed, the LED is connected to the output terminal of the AC/DC converter, and the partial output energy of the AC/DC converter is used to charge the lithium battery.

9. The circuit according to claim 2, further comprising a rectifier bridge, wherein a first AC input terminal of the rectifier bridge is connected to the neutral wire, the live wire is connected to a second AC input terminal of the rectifier bridge through the power network switch, an output positive terminal of the rectifier bridge is connected to a VBUS interface, an output negative terminal of the rectifier bridge is connected to ground, the VBUS interface is connected to a capacitor, and the VBUS interface is connected to an input terminal of the AC/DC converter.

10. The circuit according to claim 7, wherein the emergency lighting system further comprises a battery protection management module, the battery protection management module is electrically connected to a positive end and a negative end of the lithium battery, and the battery protection management module comprises a battery overcharge protection module, an overcurrent and output short circuit protection module and a battery over-discharge protection module.

11. The circuit according to claim 7, further comprising a rectifier bridge, wherein a first AC input terminal of the rectifier bridge is connected to the neutral wire, the live wire is connected to a second AC input terminal of the rectifier bridge through the power network switch, an output positive terminal of the rectifier bridge is connected to a VBUS interface, an output negative terminal of the rectifier bridge is connected to ground, the VBUS interface is connected to a capacitor, and the VBUS interface is connected to an input terminal of the AC/DC converter.

12. The circuit according to claim 7, wherein when the power network switch is closed, the AC input detection module detects that an impedance between the live wire and the neutral wire is in a low resistance state; when the power network switch is open, the AC input detection module detects that the impedance between the live wire and the neutral wire is in a high resistance state.

13. The circuit according to claim 12, wherein the switching time detection module is configured to predetermine a time, when the switching time detection module detects that a time period T for maintaining the impedance between the live wire and the neutral wire in the high resistance state by a "low resistance to high resistance to low resistance" state switching mode is less than the time, the second output terminal of the emergency lighting system outputs a low level, and when the time period is greater than or equal to the time, the second output terminal of the emergency lighting system outputs a high level.

14. The circuit according to claim 13, wherein when the second output terminal of the emergency lighting system outputs the low level, the emergency lighting system controls the switch to be open; when the second output terminal of the emergency lighting system outputs the high level, the emergency lighting system controls the switch to be closed.

* * * * *